United States Patent [19]
Marto

[11] Patent Number: 6,070,883
[45] Date of Patent: Jun. 6, 2000

[54] SEALING UNIT FOR A FUEL PRESSURE SENSOR

[75] Inventor: Heinz-Arno Marto, Weil der Stadt, Germany

[73] Assignee: Robert Bosch GmbH, Stuttgart, Germany

[21] Appl. No.: 08/860,375

[22] PCT Filed: Jul. 31, 1996

[86] PCT No.: PCT/DE96/01420

§ 371 Date: Jun. 25, 1997

§ 102(e) Date: Jun. 25, 1997

[87] PCT Pub. No.: WO97/23771

PCT Pub. Date: Jul. 3, 1997

[30] Foreign Application Priority Data

Dec. 21, 1995 [DE] Germany ............................ 195 47 890

[51] Int. Cl.[7] .................................................. F16J 15/08
[52] U.S. Cl. ........................ 277/609; 277/616; 277/637; 285/379; 285/917
[58] Field of Search .................................. 277/587, 630, 277/637, 641, 609, 616, 939; 73/756, 726, 727, 724; 285/353, 347, 917, 379

[56] References Cited

U.S. PATENT DOCUMENTS

| | | | |
|---|---|---|---|
| 1,424,094 | 6/1922 | Gunn et al. ............................. | 277/641 |
| 4,227,420 | 10/1980 | Lamadrid ................................. | 73/756 |
| 4,543,832 | 10/1985 | Van Over ................................. | 73/720 |
| 4,650,227 | 3/1987 | Babuder et al. ...................... | 285/917 X |
| 5,011,196 | 4/1991 | Sabatier et al. ...................... | 285/347 X |
| 5,313,839 | 5/1994 | Ridenour ................................... | 73/756 |
| 5,992,595 | 11/1999 | Adachi et al. ...................... | 277/637 X |

FOREIGN PATENT DOCUMENTS

| | | | |
|---|---|---|---|
| 567924 | 11/1993 | European Pat. Off. ............... | 285/379 |
| 24881 | 11/1906 | United Kingdom ...................... | 73/756 |
| 28330 | 9/1907 | United Kingdom ...................... | 73/756 |
| 589310 | 6/1947 | United Kingdom ...................... | 73/756 |
| 001380410A | 1/1975 | United Kingdom ................... | 277/630 |
| WO 9322646 | 11/1993 | WIPO ..................................... | 73/756 |

*Primary Examiner*—Anthony Knight
*Assistant Examiner*—Enoch Peavey
*Attorney, Agent, or Firm*—Ronald E. Greigg; Edwin E. Greigg

[57] ABSTRACT

The invention relates to a sealing unit for a fuel pressure sensor for sealing an at least virtually flat sealing joint between the sensor and a component that carries it via a screw connection, wherein a round sealing washer with a central bore is disposed between the threaded bolt-shaped end of the sensor housing with its central sensor bore and the bottom of the threaded bore of the component with its central pressure fluid opening. A pin is formed onto the threaded bolt-shaped end of the sensor housing, which pin centers the sealing washer, fixing it in a positive and/or frictional, non-positive manner, and rises above an end face that serves as a bearing surface for the sealing washer. The pin ends in an end face and has a length that is shorter than the thickness of the sealing washer. A sealing unit is produced that assures a reliable sealing function and permits a simple installation and disassembly of the sealing washer while reclaiming the sealing washer in a sealing position.

4 Claims, 2 Drawing Sheets

SEALING UNIT FOR A FUEL PRESSURE SENSOR

PRIOR ART

The invention is based on a sealing unit for a fuel pressure sensor.

As a rule, sealing units of this kind constitute a fuel pressure sensor in combination with a sealing washer. Both parts are separate from each other. When the fuel pressure sensor is installed in a corresponding threaded bore of a fuel carrying component, the sealing washer is first inserted into the bore. A number of difficulties arise in connection with this. The threaded bores are often let into the fuel carrying component from the side or even from underneath so that the insertion of the sealing washer is difficult simply because of gravity. Also, sometimes the threaded bores are partially or completely impossible to see into because they are blocked from view by components disposed in front of them, so that the position of the sealing washer before the insertion of the fuel pressure sensor cannot be optically controlled without some means of assistance. Therefore an off-center or tilted seating of the sealing washer cannot be detected. Consequently, leaks or damage to the threaded bore or the fuel pressure sensor, which arise when the fuel pressure sensor is tightened, are not detected.

Also, in the case of a proper installation, problems can arise at least during disassembly of the fuel pressure sensor. The sealing washer is usually still seated at the bottom of the threaded bore after the fuel pressure sensor has been unscrewed. The washer sticks there, among other things, by means of adhesion with fuel residues or by means of being jammed in the thread runout. The subsequent removal is only possible through the expenditure of a considerable amount of time. At the same time, it includes the danger of mechanically damaging the bottom of the threaded bore, which serves as the sealing face, which can lead to leaks when the fuel carrying component is reused.

Furthermore, there is the possibility that the insertion of the sealing washer will be forgotten.

In order to avoid the disadvantages associated with the prior art described, a sealing unit must be produced, which assures a reliable sealing function and a simple installation and disassembly of the sealing washer.

ADVANTAGES OF THE INVENTION

With the sealing unit according to the invention, a pin is formed onto the threaded bolt-shaped end of the sensor housing, which pin centers the sealing washer, fixing it in a positive and/or frictional, non-positive manner, and rises above an end face that serves as a bearing surface for the sealing washer. The pin, which ends in an end face, has a length that is shorter than the thickness of the sealing washer.

Before the fuel pressure sensor is screwed into the fuel carrying component, the sealing washer is placed on the pin. When the pin has a cylindrical outer contour, the sealing washer is held on the pin, for example with the aid of a lateral press fit. The sealing washer can also be glued in the region of the pin. The sealing washer is axially compressed by means of the tightening of the fuel pressure sensor, by means of which a frictional, non-positive connection between the pin and the bore of the sealing washer is produced or at least reinforced.

Independent of the fixing method, the sealing washer is attached to the fuel pressure sensor so that during storage, transport, installation, and disassembly of the fuel pressure sensor, the sealing washer remains fixed to the fuel pressure sensor in captive fashion. Consequently, the sealing washer cannot be forgotten during installation, nor can it be inserted into the threaded bore of the component in an off-center manner. As a result, most of the causes for a leak in the sealing joint between the bottom of the threaded bore and the sealing washer are eliminated. Likewise, the fixing of the sealing washer on the pin virtually rules out the possibly of a leak in the sealing joint between the sealing washer and the pin or the flat bearing surface on the threaded bolt end. Furthermore, the flat bearing surface is covered and consequently protected by the sealing washer during storage, transport, and installation.

The pin can alternatively also be embodied in the form of a truncated cone. In this instance, the cone diameter in the region of the sensor end sealing face is smaller than at the free end of the pin. The sealing washer is seated on a pin of this kind, for example via a snug fit or a glued connection. The sealing washer can also be fixed by means of partial deformations in the region of the pin edge. The deformation of the sealing washer is produced at one or more points in the region of the pin edge, for example with the aid of tools similar to center punches or drift punches. At these points, the material of the sealing washer is compressed and displaced in sections so that in these locations, it touches or engages behind the truncated cone-shaped outer contour of the pin.

The complete rear engagement with which the sealing washer material at least encompasses the outer contour in a virtual ring, is produced when the fuel pressure sensor is tightened in the threaded bore. The sealing material is plastically deformed and rests against the outer contour of the pin in a sealing, positive, and frictional, non-positive manner.

When the fuel pressure sensor is disassembled, the sealing washer is separated from the fuel carrying component while being unscrewed, because of the tensile and shear motion in the sealing joint between the sealing washer and the bottom of the threaded bore, and the sealing washer is removed from the threaded bore along with the fuel pressure sensor.

BRIEF DESCRIPTION OF THE DRAWINGS

Further details of the invention ensue from the following description of two schematically represented embodiments.

DESCRIPTION OF THE EXEMPLARY EMBODIMENTS

Figure 1:
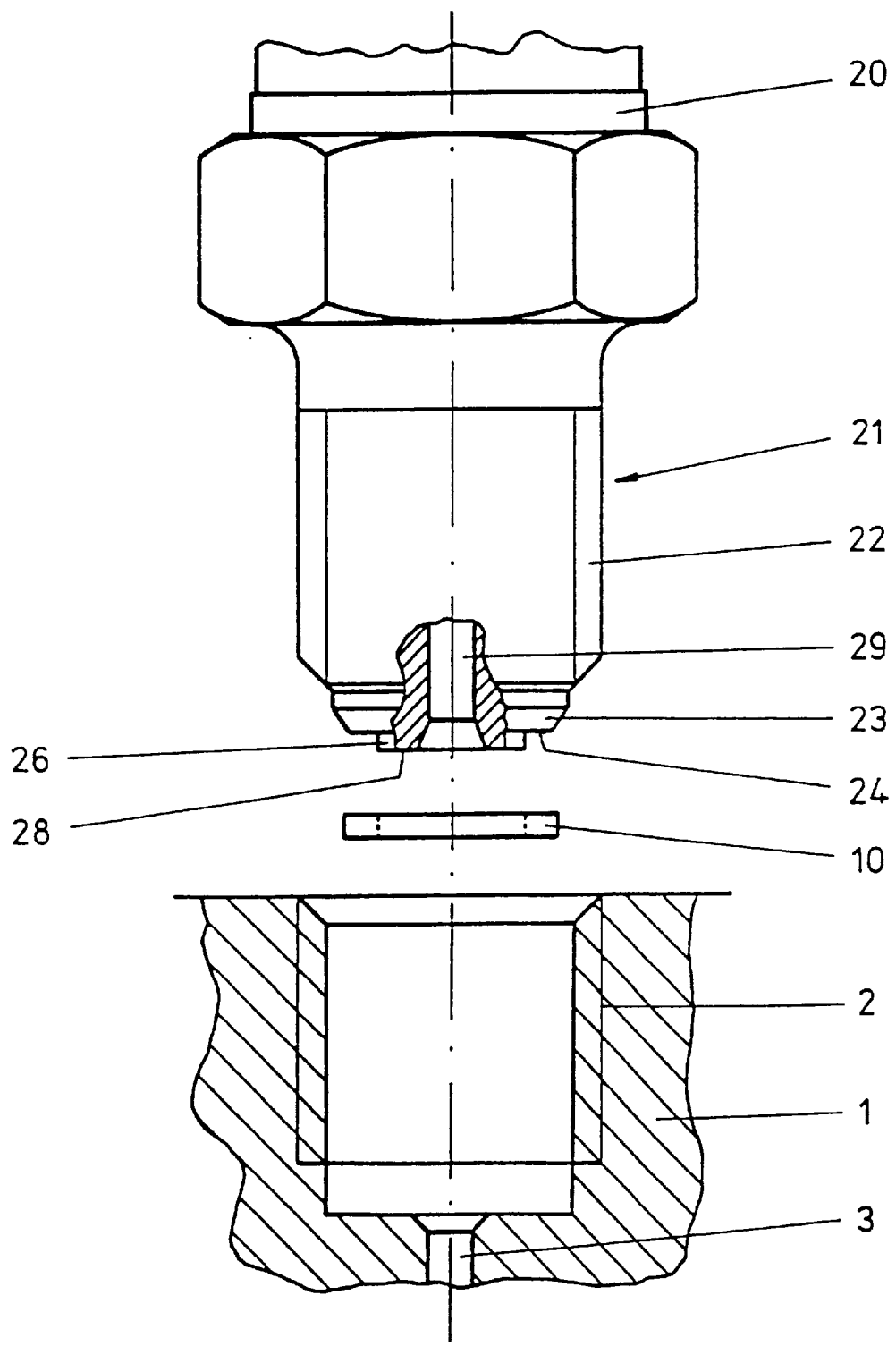
FIG. 1 shows a screwable end of the fuel pressure sensor with a sealing washer and an opposing piece.

FIG. 1 shows the threaded bolt-shaped end (21) of a fuel pressure sensor (20), a sealing washer (10) and a threaded bore (2) for receiving the fuel pressure sensor (20) in a pressure fluid carrying component (1). The components here are represented in a disassembled state.

The outer contour of the threaded bolt-shaped end (21) includes a threaded section (22), a bearing section (23) adjoining this, and a centering pin (26) formed onto this bearing section. The bearing section (23) has a cylindrical outer contour whose diameter is smaller than the core diameter of the thread (22). The cylindrical outer contour transitions into an annular end face (24) via a chamfer. This end face (24) is used as the sensor end sealing face. In FIG.

1, the centering pin (26) likewise has a cylindrical outer contour, whose diameter is slightly larger than the inner diameter of the sealing washer (10). The centering pin (26) ends in an end face (28). The length of the centering pin (26) is shorter than the thickness of the sealing washer (10).

The threaded bolt-shaped end (21) of the fuel pressure sensor (20) has a central bore (29), which feeds into the end face (28). The transition region is chamfered.

A threaded bore (2) is disposed in the component (1) that carries the fuel pressure sensor (20) and the sensor is seated in this bore when installed. The bottom of the threaded bore (2) is a smooth face that functions as a component end sealing face. The diameter there is matched in proportion to the outer diameter of the sealing washer (10) so that the outer diameter of the sealing washer (10), which increases as a result of assembly, is reliably smaller than the inner diameter of the threaded bore (2) or the bottom of the threaded bore.

A pressure fluid opening (3) is disposed centrally in the bottom of the threaded bore (2).

Figure 2:
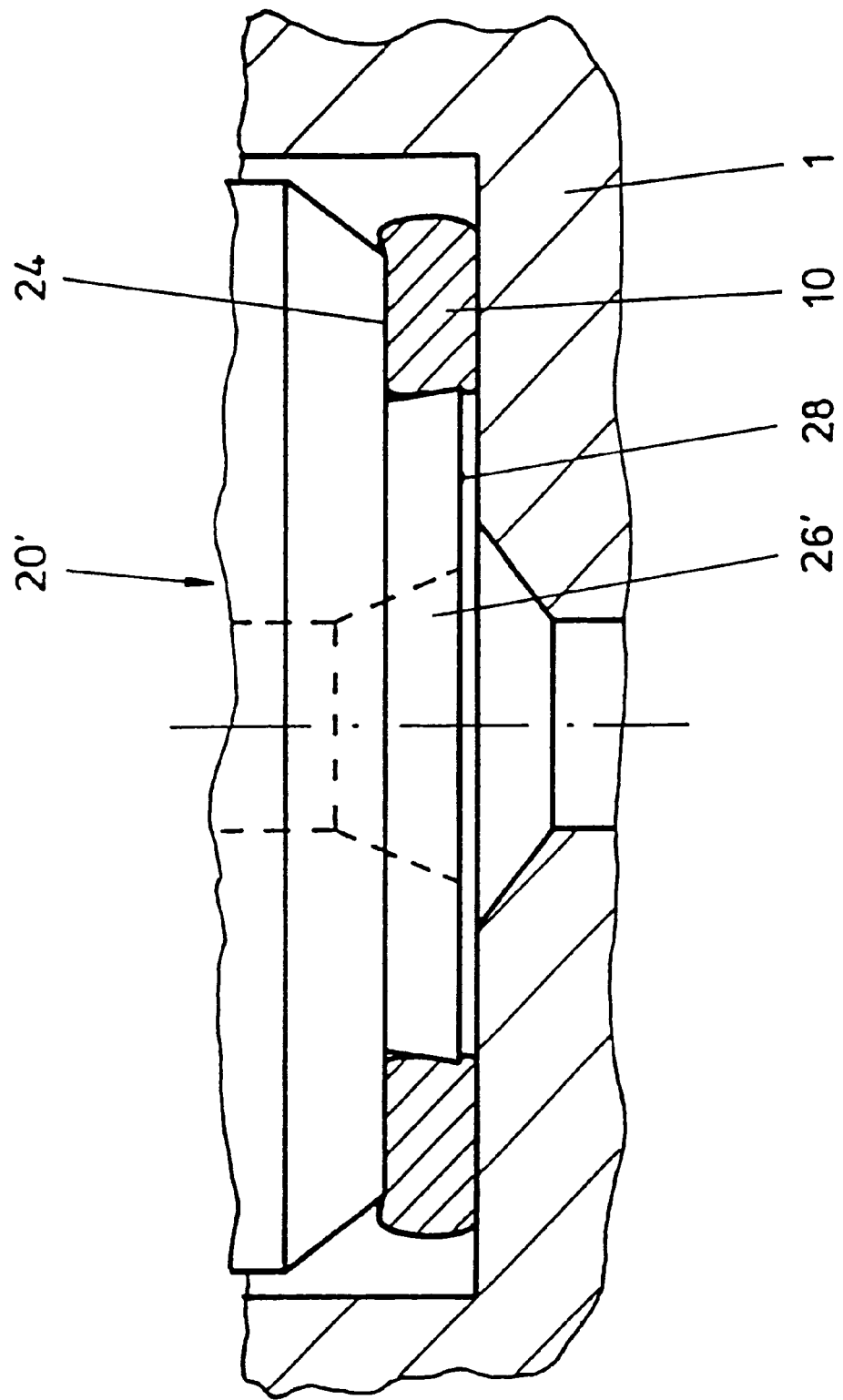
FIG. 2 shows the screw installed fuel pressure sensor with a truncated cone-shaped pin and a deformed sealing washer.

FIG. 2 shows a fuel pressure sensor (20') in the installed state. In this instance, the centering pin (26') of the fuel pressure sensor (20') has an outer contour in the shape of a truncated cone whose diameter decreases from the free end or from the end face (28) toward the threaded section (21). When the fuel pressure sensor (20') is tightened, this contour permits a positive connection between the fuel pressure sensor (20') and the sealing washer (10) because of the deformation or the flattening and mushrooming over of the sealing washer (10).

To this end, before the fuel pressure sensor (20') is screwed in, the sealing washer (10) is attached to the centering pin (26') in captive fashion with the aid of a close, snug fit. In lieu of the snug fit connection, the un-deformed sealing washer (10) can also be glued to the annular end face (24).

When the fuel pressure sensor (20') is installed, it is inserted into the threaded bore together with the sealing washer (10) attached to it and is screwed in. After the sealing washer (10) comes into contact with the component end sealing face, the sealing washer (10) is deformed by being pressed flat when the screw connection is tightened as provided. By means of the material displacement among other things, the inner diameter of the sealing washer (10) is reduced and the outer diameter is enlarged. By means of the deformation of the inner diameter, the sealing washer (10) engages behind the centering pin (26'), see FIG. 2. The height of the sealing washer (10) after the deformation is still greater than the height of the centering pin (26').

In a subsequent disassembly, the used, deformed sealing washer (10) adheres to the threaded bolt-shaped end (21) of the fuel pressure sensor (20'). The sealing washer (10) can be separated from the fuel pressure sensor (20') with the aid of cutting pliers, without the danger of damaging the sensor in order, if need be, to outfit the fuel pressure sensor (20') for reuse with a new sealing washer (10). This is also true for the fuel pressure sensor (20) that has a cylindrical centering pin (26). In that instance, the sealing washer (10) can be removed with less of an expenditure of force since it does not adhere positively to the centering pin (26).

The foregoing relates to preferred exemplary embodiments of the invention, it being understood that other variants and embodiments thereof are possible within the spirit and scope of the invention, the latter being defined by the appended claims.

What is claimed is:

1. A sealing unit in combination with an end of a fuel pressure sensor housing, said fuel pressure sensor housing being secured to a fluid pressure carrying component which includes a central pressure fluid opening, said sensor housing includes a central unobstructed sensor bore (29) through which fuel flows, screw threads (22) along a bolt threaded end (21), a bearing end section (23) adjoining integral with said bolt threaded end and a centering pin (26) extends from said bearing end section, said bearing end section (23) including an end sealing face (24), said component includes a threaded bore (2) to which the sensor housing is secured via said threaded end (21), said sealing unit comprises a disk-type sealing washer (10) with a control bore, said sealing washer is permanently deformed and disposed on said centering pin between said sealing face (24) of the bearing end section (23) of said sensor housing in engagement with said end sealing face (24) and a bottom of the threaded bore of said component, said centering pin (26, 26') centers the sealing washer (10) fixing the sealing washer in a positive and frictional manner on said pin, wherein the pin (26, 26') has an axial length that is shorter than a thickness of the sealing washer (10).

2. The sealing unit according to claim 1, in which an outer contour of the pin (26) is cylindrical.

3. The sealing unit according to claim 1, in which the sealing washer (10) is fixed on the pin (26) by means of a lateral press fit.

4. The sealing unit according to claim 1, in which the pin (26') is embodied in the shape of a truncated cone, wherein the cone diameter in a region of the sensor end sealing face is smaller than at a free end of the pin (26').

* * * * *